United States Patent [19]
Knifton et al.

[11] Patent Number: 4,683,335
[45] Date of Patent: Jul. 28, 1987

[54] CATALYTIC PROCESS FOR THE PREPARATION OF LINEAR POLYETHYLENEPOLYAMINES WITH TUNGSTOPHOSPHORIC ACID-OR MOLYBDOPHOSPHORIC ACID-ON-TITANIA CATALYSTS

[75] Inventors: John F. Knifton; Neal J. Grice, both of Austin, Tex.

[73] Assignee: Texaco Inc., White Plains, N.Y.

[21] Appl. No.: 909,042

[22] Filed: Sep. 18, 1986

[51] Int. Cl.$^4$ ............................................. C07C 85/06
[52] U.S. Cl. .................................................... 564/480
[58] Field of Search ......................................... 564/480

[56] References Cited

U.S. PATENT DOCUMENTS

| | | |
|---|---|---|
| 2,591,493 | 4/1952 | Arnold et al. ................. 564/480 X |
| 2,953,601 | 9/1960 | Whitaker ............................. 564/480 |
| 3,383,417 | 5/1968 | Lichtenwalter ..................... 564/480 |
| 3,387,032 | 6/1968 | Leonard ......................... 564/480 X |
| 3,475,344 | 10/1969 | Adam et al. ..................... 564/480 X |
| 4,036,881 | 7/1977 | Brennan et al. ................. 564/480 X |
| 4,044,053 | 8/1977 | Brennan et al. ................. 564/480 X |
| 4,206,150 | 6/1980 | Slaugh ................................. 564/480 |
| 4,394,524 | 7/1983 | Ford et al. ....................... 564/480 X |
| 4,552,961 | 11/1985 | Herdle ............................ 564/480 X |

*Primary Examiner*—Paul F. Shaver
*Attorney, Agent, or Firm*—J. H. Park; Kenneth R. Priem; Carl G. Ries

[57] ABSTRACT

This invention is directed to novel catalyst compositions based on titania pellets on which a minor amount of tungstophosphoric acid or molybdophosphoric acid is deposited. Also, the invention is directed to a process for preparing predominantly linear polyethylenepolyamines from ethylenediamine and monoethanolamine using the novel catalyst compositions.

18 Claims, No Drawings

CATALYTIC PROCESS FOR THE PREPARATION OF LINEAR POLYETHYLENEPOLYAMINES WITH TUNGSTOPHOSPHORIC ACID-OR MOLYBDOPHOSPHORIC ACID-ON-TITANIA CATALYSTS

BACKGROUND OF THE INVENTION

1. Technical Field of the Invention

This invention relates to a process for the preparation of predominantly linear polyethylenepolyamines from ethylenediamine and monoethanolamine in the presence of unique catalyst compositions prepared by depositing a minor amount of tungstophosphoric acid or molybdophosphoric acid on titania.

2. Prior Art

Heretofore, polyethylenepolyamine compounds such as diethylenetriamine, triethylenetetramine and the higher homologs have been produced by the reaction of an alkyl halide such as ethylene dichloride with an amine such as ammonia or ethylenediamine at elevated temperatures and pressures. Normally, relatively high yields of predominantly non-cyclic polyethylenepolyamine compounds are obtained from this process with varying yields of heterocyclic amines. The large amounts of energy required to produce the reactants as well as the difficult separation procedures required to recover the more valuable linear polyethylenepolyamines diminish the usefulness of the ethylene dichloride process. The hydrohalide salts of ammonia and the polyethylenepolyamine products must also undergo difficult and time consuming caustic neutralization to yield the free polyethylenepolyamines.

It has heretofore been known that phosphates can be used to catalyze reactions to produce predominantly heterocyclic rather than linear products. Thus, U.S. Pat. No. 3,297,701 teaches the use of aluminum phosphate to catalyze the reaction of ethanolamines and polyethylenepolyamines to yield cyclic compounds. U.S. Pat. No. 3,342,820 discloses the use of aluminum phosphate for the preparation of heterocyclic compounds such as triethylenediamine. As another example, U.S. Pat. No. 4,103,087 also discloses the use of aluminum phosphate catalysts for producing heterocyclic product compounds.

More recently, investigators have found that more linear products can also be obtained in a catalyst conversion. Johnson et al. U.S. Pat. No. 4,463,193 and U.S. Pat. No. 4,578,517 are directed to the reaction of an alkanolamine with an alkyleneamine and ammonia in the presence of a catalytically effective amount of a group IIIB metal acid phosphate to give primarily noncyclic polyalkylene polyamine products. Thus, in Table 4 of U.S. Pat. No. 4,463,193, Johnson et al. disclose the reaction of monoethanolamine with ethylenediamine and ammonia using catalysts such as lanthanum acid phosphate and praseodynium acid phosphate at conversions of about 11 to 43% of monoethanolamine to give a noncyclic selectively of about 67% to 92%. In Ford et al. U.S. Pat. No. 4,503,253, phosphoric acid incorporated onto an inert support (silica) was used as a catalyst and in Table 1 of the patent, use of this type of catalyst was shown to provide monoethanolamine conversions of 34% to 68% with a selectivity to noncyclics of 62% to 86%.

European patent application No. 0,073,520 dated Aug. 31, 1982 for Ford and Johnson disclosed that the reaction of monoethanolamine with ethylenediamine and ammonia can be catalyzed with acidic metal phosphates, phosphoric or phosphorous acid or their anhydrides and alkyl or aryl esters (e.g., boron phosphate, ferric phosphate, aluminum phosphate, etc.). U.S. Pat. No. 4,314,083 discloses the reaction of ethylenediamine with monoethanolamine to prepare noncyclic polyalkylenepolyamines using, as a catalyst, a salt of a nitrogen or sulfur-containing compound.

In inventions originating in our laboratories, Brennan et al. in U.S. Pat. No. 4,036,881 discloses the use of phosphorus-containing catalysts to catalyze the reaction of ethylenediamine with monoethanolamine. Excellent results were obtained when the reaction was conducted in an autoclave. However, when the phosphorus compound was supported on silica or diatomaceous earth, good results were obtained only at comparatively low conversions. Brennan et al. U.S. Pat. No. 4,044,053 is also relevant in this regard. Brennan U.S. Pat. No. 4,448,997 is directed to an alumina phosphate-type catalyst composition wherein the novel feature is the method of preparing a catalyst from alumina phosphoric acid, ammonium hydroxide and water. Excellent results were obtained using a catalyst of this nature in batch-type reactions.

More recently, Vanderpool and co-workers in a series of U.S. patents (U.S. Pat. Nos. 4,540,822 issued Sept. 10, 1985; 4,578,518 and 4,578,5519 issued Mar. 23, 1986; 4,584,406 issued Apr. 22, 1986 and 4,588,842 issued May 13, 1986) have disclosed that the reaction of monoethanolamine with ethylenediamine to provide essentially noncyclic polyethylenepolyamine reaction products can be effectively promoted with catalysts composed of a minor amount of phosphorus thermally, chemically bonded to a group IVb metal oxide support such as titania or zirconia. Also, in U.S. Pat No. 4,555,582 issued Nov. 26, 1983, Vanderpool used a zirconium silicate catalyst to promote this reaction. Zimmerschied et al. U.S. Pat. No. 2,921,081 discloses catalysts for use in the conversion of olefins that are prepared by reacting a zirconium halide with a designated class of phosphoric acids.

Rylander et al. U.S. Pat. No. 2,824,073 is concerned with the manufacture of a titanium-phosphoric acid catalyst that can be prepared by mixing titania with triphosphoric acid to form a doughy mixture which is thereafter dried and heated.

The text, "Refractories", by F. H. Norton (McGraw-Hill Book Company, Inc., 1949) in pages 318 and 319 discloses hafnium oxide, titanium oxide and zirconium oxides as well-known refractories.

SUMMARY OF THE INVENTION

Novel catalysts are disclosed which are prepared by depositing a minor amount of tungstophosphoric acid or molybdophosphoric acid on titania and which can be used effectively to catalyze the reaction of monoethanolamine with ethylenediamine.

Thus, the catalysts are useful in the improved production of predominantly linear polyethylenepolyamines from ethylenediamine and monoethanolamine. The novel catalysts of the claimed invention can be prepared by treating titania (preferably in pelleted form) in a manner to be described with molybdophosphoric acid or tungstophosphoric acid.

DETAILED DESCRIPTION

In one aspect of the invention the catalysts of the present invention are used in producing essentially linear polyethylenepolyamines such as diethylenetriamine, triethylenetetramine, tetraethylenepentamine and pentaethylenehexamine from the reaction of ethylenediamine and monoethanolamine.

In another aspect, the present invention is directed to an improved catalyst composition composed of titania having deposited thereon a minor amount of a tungstophosphoric acid or a molybdophosphoric acid.

The novel catalyst compositions catalyze the reaction of ethylenediamine with monoethanolamine at a temperature of from about 250° C. to about 400° C., preferably from about 270° C. to about 320° C. and a pressure of from about 500 (34.47 bar gauge) to about 3000 psig. (206.8 bar gauge) and preferably from about 1000 (68.9 bar gauge) to about 2000 psig. (137.8 bar gauge). Higher temperatures and pressures can be used, if desired, but there is no particular advantage in using such higher temperatures and/or pressures.

The pelleted catalyst compositions of the present invention are preferably employed as a fixed bed of catalyst in a continuous reaction system. In a continuous process of this nature, the time of contact of the reactants with the catalyst is one of the interrelated factors that those skilled in the art will adjust, along with temperature, pressure, bed geometry, pellet size, etc. in order to obtain a desired rate of reaction and, hence, a desired percentage of conversion of the reactants. Thus, in a continuous process, it is not necessary to drive the reaction to completion because unreacted feedstock components can be recycled to the reactor.

It is customary to use cylindrically-shaped catalyst pellets having a diameter essentially equal to the length thereof, such as diameters and lengths ranging from about 0.794 mm (1/32 inch) to about 9.525 mm (⅜ inch). It will be understood that the shape and dimensions of the pellets are not critical to the present invention and that pellets of any suitable shape and dimensions may be used as desired, by one wishing to practice the process of the present invention.

When cylindrical pellets of catalyst of the type described above are used, the weighted hourly space velocity may be varied within wide limits (e.g., 0.1 to 5 w/hr/w) in order to obtain a desired rate of conversion, as explained above. Normally, space velocities of about 0.5 to 2 w/hr/w will be employed.

Catalyst life is an important factor in conducting a continuous reaction. For example, if a catalyst is easily poisoned, or if catalyst pellets do not have good structural properties, the economics of the process will be seriously and adversely affected.

The catalysts of the present invention are not particularly susceptible to poisoning so this normally does not present a problem. However, under the reaction conditions employed, amines of the type used and formed herein have the potential capability of leaching or otherwise adversely affecting the structural integrity of the pellets. In an extreme instance, catalyst pellets having good initial crush strength and surface hardness will be reduced to fines very rapidly when used under reaction conditions such as those employed herein.

As a consequence, the catalyst compositions of the present invention are advantageously used for a continuous process for the continuous production of essentially linear polyethylenepolyamine reaction products from monoethanolamine and ethylenediamine. Such catalyst compositions can be used for prolonged periods without the need for regeneration (e.g., 1,000 hours or more). Nevertheless, with the passage of time deactivation will tend to slowly occur. Deactivataion can be measured qualitatively as the increase of temperature required to maintain an essentially constant conversion rate for the monoethanolamine and ethylenediamine.

The catalyst compositions of the present invention are prepared by depositing a minor amount of a molybdophosphoric acid or a tungstophosphoric acid on titania. Titania pellets can be prepared by extrusion or by compaction in conventional pelleting apparatus using a pelleting aid such as graphite. It is also within the scope of the present invention to deposit the molybdophosphoric acid or tungstophosphoric acid on titania followed by pelleting and calcination.

Any appropriate molybdophosphoric acid or tungstophosphoric heteropoly acid, or their salts, may be used to prepare the catalyst compositions of this invention. Suitable examples include 12-tungstophosphoric acid, having the general formula $H_3[PM_{12}O_{40}]$, where M=Mo or W, other heteropolymolybdates and tungstates having the structure $[P_2M_{18})_{62}]^{6-}$, where the ratio of P to Mo or W is 2:18, $[PM_{11}O_{39}]^{5-}$ where the P:Mo ratio is 1:11, as well as phosphomolybdates $[PMo_{10}O_x]^{n-}$ and $[P_2Mo_{17}O_x]^{m-}$, where n, m and x are integers. The heteropolymolybdates and tungstates may be employed in their acid form or as their salts, such as sodium 12-molybdate, $Na_3[PMo_{12}O_{40}]$, and potassium 12-tungstophosphatae. Both the heteropoly acids and their salts may be used as their hydrates.

The preferred phosphomolybdate is 12-molybdophosphoric acid and the preferred heteropoly phosphotungstate is 12-tungstophosphoric acid. These acids are preferably used in the form of an aqueous solution containing about 1% to about 50% of the acid. It is within the scope of the present invention to use an aqueous solution of two or more tungstophosphoric acids or two or more molybdophosphoric acids or a mixture of a tungstophosphoric acid with a molybdophosphoric acid.

As a matter of convenience, the normal practice is to use only one chemical as an acid source.

Preferably the catalyst composition is prepared by impregnating a preformed pellet. A suitable procedure to be used is to immerse titania pellets in an aqueous solution of the acid, preferably at ambient temperature. Higher temperatures of about 100° to about 150° C. can be used, if desired. This treatment should be continued, preferably with agitation, for about 0.1 to about 5 hours sufficient to permit the aqueous solution to penetrate the pores of the titania pellet. Suitably, the amount of aqueous solution of the acid that is used should be adequate to permit full immersion of the titania pellets. Larger amounts of the aqueous solution can be used, if desired, but there is no particular advantage in doing so. At the end of the immersion step, the excess aqueous solution can be evaporated from the treated pellets or the pellets can be removed from the aqueous solution and permitted to dry (e.g., in a drying oven).

Only a minor amount of tungstophosphoric acid or molybdophosphoric acid will be permanently deposited on the titania pellets by this procedure, such that the treated titania pellets will have only about 0.01 to about 10 wt. % of phosphorus deposited thereon, and normally about 1 wt. % or less (e.g., 0.1 to 1 wt. %). A small but significantly larger percentage of tungsten or molybdenum will be codeposited on the titania, such as about 0.1 to about 30 wt. %, and normally from about 1 to about 10 wt. % of tungsten or molybdenum.

It will be understood that the phosphorus and tungsten or molybdenum that are present on thus-treated titania pellets are not present as elemental compounds, but rather as tungstophosphorus or molybdophosphorus groups that are chemically bound, normally as an oxide, to the titania support. The exact nature of the bonding is not completely understood.

The pelleted catalyst compositions of the present invention should be calcined. They can be calcined prior to use or calcined in situ when used as catalysts at temperatures in excess of about 100° C. When the catalysts are to be calcined prior to use, calcination is suitably conducted for 2 to 24 hours at a temperature of 100° C. but below the temperature at which thermal destruction of the chemical bonding occurs. This can be determined by routine experimentation for a particular catalyst. Temperatures above 900° C. should be avoided. A suitable calcining temperature range is normally 200° to 800° C. and, more preferably, 300° to 600° C.

Alternatively, the titania can be treated in powdered form with the aqueous acidic solution and the powder can thereafter be pelleted. If the pelleting treatment is conducted at a temperature of about 100° C. or more, thermal activation will normally have been obtained and it will not be absolutely necessary to perform a calcining operation before use. If lower treating temperatures are used, calcining is normally a desired operation before use. The calcining operation can be conducted prior to or subsequent to the pelleting step.

In any event, in-situ calcining will occur when the pelleted compositions are used to catalyze the reaction of monoethanolamine with ethylenediamine at 250° to 400° C.

There are many compounds which can be formed from the reaction of ethylenediamine and monoethanolamine besides the preferred linear polyethylenepolyamines such as diethylenetriamine, triethylenetetramine, tetraethylenepentamine and pentaethylenehexamine. Less desirable cyclics and other compounds, such as piperazine, N-(2-aminoethyl)ethanolamine and N-(2-aminoethyl)piperazine, are also formed. The more desired linear polyethylenepolyamines can be easily recovered from the reaction product mixture by conventional methods such as distillation. Such distillation recovery methods are well known in the art. An outstanding advantage of the claimed invention is that the lower molecular weight polyethylenepolyamines recovered from the reaction mixture can be further reacted with monoethanolamine to produce a larger percentage of the higher molecular weight linear polyethylenepolyamines.

Ammonia may also be added as a reactant in the generation of the preferred linear polyethylenepolyamines from ethylenediamine and monoethanolamine using the tungstophosphoric acid and molybdophosphoric acid on titania catalysts of this invention.

The following examples will further illustrate the preparation of predominantly linear polyethylenepolyamines from ethylenediamine and monoethanolamine by the use of the catalyst compositions of the present invention. They are given by way of illustration and not as limitations on the scope of the invention. Thus, it will be understood that reactants, proportions of reactants, and time, temperature and pressure of the reaction steps may be varied with much the same results achieved.

For purposes of convenience and brevity, the reactant compounds employed and the products obtained have been abbreviated in the following examples and tables. The abbreviations employed for these various compounds are:

EDA - ethylenediamine,
MEA - monoethanolamine,
PIP - piperazine,
DETA - diethylenetriamine,
TETA - triethylenetetramine,
TEPA - tetraethylenepentamine,
AEEA - N-(2-aminoethyl)ethanolamine,
AEP - N-(2-aminoethyl)piperazine,
HEP - N-(hydroxyethyl)piperazine.

I. TUNGSTOPHOSPHORIC ACID TITANIA CATALYST PREPARATIONS

A series of pelleted catalysts were prepared by depositing tungstophosphoric acid on a titania support.

EXAMPLE I

Preparation of 12-Tungstophosphoric Acid-on-Titania (5972-62)

To a 125-cc of titania extrudates ($\frac{1}{8}''$ extrudates, 51 m$^2$/g surface area, provided by the Norton Company) is added a solution of 10.0 g of 12-tungstophosphoric acid in 50 ml of water. The mixture is stirred to absorb the liquid into the pores of the solid, excess liquid is recovered by slow rotary evaporation, and 127.5 g of white extrudates are isolated.

Analysis of the extrudates shows the presence of 0.13% phosphorus and 5.4% tungsten.

EXAMPLES 2-7

Additional 12-Tungstophosphoric Acid on Titania Catalysts

The procedure of Example 1 was repeated using $\frac{1}{8}''$ titania extrudates impregnated with differing quantities of tungstophosphoric acid. The amount (in grams) of tungstophosphoric acid used and the amount of tungsten and phosphorus deposited on the titania pellets is set out below:

| Example | Weight (gms) of Tungstophosphoric Acid Used | % of Phosphorus Deposited | % of Tungsten Deposited |
|---|---|---|---|
| 2[1] | 10.0 | 0.1 | 6.0 |
| 3[2] | 20.0 | 0.2 | 9.5 |
| 4[2] | 40.0 | 0.4 | 17.5 |
| 5[3] | 10.0 | a | 3.8 |
| 6[2] | 5.0 | a | 3.0 |
| 7[3] | 20.0 | a | 6.7 |

[1] 125 ml of pellets having a surface area of 120 m$^2$/g.
[2] 125 ml of pellets having a surface area of 51 m$^2$/g.
[3] 125 ml of pellets having a surface area of 60 m$^2$/g.
a Not determined.

EXAMPLE 8

Preparation of 12-Molybdophosphoric Acid-on-Titania (5972-75)

To a 125-cc of titania extrudates ($\frac{1}{8}''$ extrudates, 51 m$^2$/g surface area, provided by the Norton Company) is added a solution of 10.0 g of 12-molybdophosphoric acid in 50 ml of water. The mixture is stirred to absorb the liquid into the pores of the solid, excess liquid is removed by slow evaporation, and 110.3 g of yellow extrudates are recovered.

Analysis of the extrudates shows the presence of 0.13% phosphorus and 3.4% molybdenum.

EXAMPLE 9

Polyethylenepolyamine Synthesis (6030-29)

To a 125-cc tubular, fixed bed reactor is charged 100 cc of the 12-tungstophosphoric acid-on-titania catalyst of Example 1. The catalyst bed is calcined in place at 350° C. for 2 hours under a stream of nitrogen. A mixture of ethylenediamine and monoethanolamine (2:1 weight ratio) is then run through the reactor bed, in the upflow mode, at a series of amination temperatures ranging from 270° to 310° C. Pressure within the reactor system is maintained at 1500 psig, the LHSV=1.0. The liquid effluent from the reactor, under steady state conditions is sampled and analyzed by glc. The data are summarized below:

| Operating Temp., °C. | MEA Conv. (%) | DETA/PIP Ratio | % Noncyclics in TETA Range |
| --- | --- | --- | --- |
| 270 | 15.9 | >30 | a |
| 280 | 34.9 | >30 | a |
| 290 | 45.8 | >30 | 98.4 |
| 300 | 57 | >30 | 96.9 |
| 310 | 70.3 | 28.6 | 94.5 | a = Insufficient TETA to calculate this number.

EXAMPLES 10-15

Example 9 was repeated using the catalysts of Examples 2-7. The results obtained are summarized below.

Example 10 (5972-81)

| Temp (°C.) | MEA Conversion (%) | DETA/PIP | % Non-Cyclics |
| --- | --- | --- | --- |
| 273 | 36.1 | DETA only | Non-cyclics only |
| 282 | 42.9 | DETA only | Non-cyclics only |

Example 11 (5972-82)

| Temp (°C.) | MEA Conversion (%) | Ratio DETA/PIP | % Non-Cyclics |
| --- | --- | --- | --- |
| 269 | 17.6 | 84.3 | 100 |
| 278 | 36.7 | 65.5 | 87.9 |
| 294 | 49.3 | 37.8 | 94.8 |
| 302 | 66.1 | 19.7 | 91.8 |
| 312 | 82.6 | 9.4 | 89.5 |

Example 12 (5972-83)

| Temp (°C.) | MEA Conversion (%) | Ratio DETA/PIP | TETA Range % Non-Cyclics |
| --- | --- | --- | --- |
| 269 | 15.7 | DETA only | a |
| 291 | 40.3 | 72.3 | 86.0 |
| 308 | 90.7 | 1.26 | 35.7 | a Insufficient material in the TETA range to determine this number

Example 13 (5972-84)

| Temp (°C.) | MEA Conversion (%) | Ratio DETA/PIP | TETA Range % Non-Cyclics |
| --- | --- | --- | --- |
| 269 | 9.0 | DETA only | — |
| 280 | 14.3 | DETA only | — |
| 290 | 24.7 | 117.3 | 100 |
| 300 | 36.1 | 71.8 | 100 |
| 310 | 46.9 | 36.5 | 97.4 |

Example 14 (5972-86)

| Temp (°C.) | MEA Conversion (%) | Ratio DETA/PIP | TETA Range % Non-Cyclics |
| --- | --- | --- | --- |
| 269 | 14.0 | DETA only | — |
| 281 | 18.7 | DETA only | — |
| 290 | 27.0 | 131.1 | 100 |
| 297 | 31.6 | 66.8 | 100 |
| 310 | 52.9 | 51.3 | 100 |

Example 15 (5972-92)

| Temp (°C.) | MEA Conversion (%) | Ratio DETA/PIP | TETA Range % Non-Cyclics |
| --- | --- | --- | --- |
| 269 | 10.9 | DETA only | a |
| 279 | 16.9 | 255.5 | a |
| 289 | 24.1 | 117.6 | 100 |
| 299 | 44.6 | 38.7 | 96.8 |
| 310 | 70.6 | 8.0 | 79.4 | a Insufficient material in the TETA range to determine this number.

From the foregoing examples it is seen that the tungstophosphoric acid-on-titania catalysts of the present invention provide reaction products that are wholly linear or predominantly linear insofar as the reaction of monoethanolamine with ethylenediamine is concerned.

Thus, in Example 9 good conversions of MEA to highly linear products was obtained at reaction temperatures of 290° to 310° C. In Example 10, wholly noncyclic products were obtained at 273° and 282° C. at moderatae MEA conversions of about 35 to 45%.

Equivalent results were obtained in Examples 11-15.

EXAMPLE 16

Polyethylenepolyamine Synthesis (6112-10)

To the 125-cc tubular reactor of Example 9 is charged 100 cc of the 12-molybdophosphoric acid-on-titania catalyst of Example 8. The catalyst bed is calcined in place at 350° C., then at 2:1 EDA/MEA mix is run through the reactor bed, in the upflow mode, at a series of amination temperatures. Pressure within the reactor system is maintained at 1500 psig, the LHSV=1.0. The liquid effluent from the reactor, under steady state conditions, is sampled and analyzed by glc. The data are summarized below:

| Operating Temp., °C. | DETA/PIP Ratio | % Non-Cyclics in TETA Range |
| --- | --- | --- |
| 269 | 41 | 76.5 |
| 278 | 29 | 71.6 |
| 289 | 23 | 72.7 |
| 302 | 1.4 | 67.0 |
| 312 | 1.1 | 68.0 |

The foregoing examples of the present invention have been given by way of illustration only and are not intended as limitations on the scope of the invention which is defined by the following claims.

We claim:

1. In a method wherein monoethanolamine is reacted with ethylenediamine in a reaction zone in the presence of a phosphorus-containing catalyst to provide an essentialy noncyclic product comprising polyethylenepolyamines, the improvement for conducting said process on a continuous basis which comprises:
   a. using, as a catalyst, titania pellets having deposited thereon a minor amount of a tungstophosphoric acid or a molybdophosphoric acid or a mixture thereof;
   b. continuously contacting a mixture of ethylenediamine and monoethanolamine in a molar ratio of about 1 to 5 moles of ethylenediamine per mole of monoethanolamine with said pelleted catalyst at a temperature of about 250° to about 400° C. and a pressure of about 500 to about 3000 psig. to obtain an essentially noncyclic reaction product.

2. A method as in claim 1 wherein a minor amount of a tungstophosphoric acid is deposited on the titania pellets.

3. A method as in claim 1 wherein a minor amount of a molybdophosphoric acid is deposited on the titania pellets.

4. In a method wherein monoethanolamine is reacted with ethylenediamine in a reaction zone in the presence of a phosphorus-containing catalyst to provide an essentially noncyclic product comprising polyethylenepolyamines, the improvement for conducting said process on a continuous basis which comprises:
   a. using, as a catalyst, a composition prepared by impregnating titania pellets with an aqueous solution of a tungstophosphoric acid or a molybdophosphoric acid or a salt thereof or a mixture thereof, and thereafter drying and calcining the titania pellets to thereby provide a catalyst composition composed of titania pellets having from about 0.01 to about 10 wt. % of phosphorus and about 0.1 to about 30 wt. % of tungsten or molybdenum or a mixture thereof deposited thereon;
   b. continuously contacting a mixture of ethylenediamine and monoethanolamine in a molar ratio of about 1 to 5 moles of ethylenediamine per mole of monoethanolamine with said pelleted catalyst at a temperature of about 270° to about 320° C. and a pressure of about 1,000 to about 2,000 psig. to obtain an essentially noncyclic reaction product.

5. A method as in claim 4 wherein a minor amount of a tungstophosphoric acid is deposited on the titania pellets.

6. A method as in claim 5 wherein the tungstophosphoric acid is 12-tungstophosphoric acid.

7. A method as in claim 4 wherein a minor amount of a molybdophosphoric acid is deposited on the titania pellets.

8. A method as in claim 7 wherein the molybdophosphoric acid is 12-molybdophosphoric acid.

9. As a new composition of matter, a catalytically active pelleted composition, said composition having been prepared by impregnating titania pellets with an aqueous solution of a tungstophosphoric acid or a molybdophosphoric acid or a mixture thereof and by thereafter drying and calcining the thus-treated titania pellets to thereby provide a catalyst composition composed of titania pellets having from about 0.1 to about 10 wt. % of phosphorus and about 0.1 to about 30 wt. % of tungsten or molybdenum or a mixture thereof deposited thereon.

10. A composition as in claim 9 wherein a minor amount of tungstophosphoric acid is deposited on the titania pellets.

11. A composition as in claim 10 wherein the tungstophosphoric acid is 12-tungstophosphoric acid.

12. A composition as in claim 9 wherein a minor amount of a molybdophosphoric acid is deposited on the titania pellets.

13. A method as in claim 12 wherein the molybdophosphoric acid is 12-molybdophosphoric acid.

14. As a new composition of matter, a catalytically active pelleted composition, said composition having been prepared by immersing titania pellets in about a 1 wt. % to about a 50 wt. % aqueous solution of a tungstophosphoric acid or a molybdophosphoric acid or a sodium or a potassium salt thereof or a mixture thereof for about 0.1 to about 5 hours at a temperature of up to about 150° C. and by thereafter drying and calcining the thus-treated titania pellets at a temperature of about 200° to about 800° C. for about 2 to about 24 hours to thereby provide a catalyst composition composed of titania pellets having from about 0.1 to about 1.0 wt. % of phosphorus and about 0.1 to about 30 wt. % of tungsten or molybdenum or a mixture thereof deposited thereon.

15. A composition as in claim 14 wherein the acid is a tungstophosphoric acid or a sodium or potassium salt thereof.

16. A composition as in claim 15 wherein the tungstophosphoric acid is 12-tungstophosphoric acid.

17. A composition as in claim 14 wherein the acid is a molybdophosphoric acid or a sodium or a potassium salt thereof.

18. A method as in claim 17 wherein the molybdophosphoric acid is 12-molybdophosphoric acid.

* * * * *